United States Patent
Baur

(10) Patent No.: US 7,121,738 B2
(45) Date of Patent: Oct. 17, 2006

(54) BIDIRECTIONAL OPTICAL TRANSMITTING AND RECEIVING MODULE

(75) Inventor: Elmar Baur, Regensburg (DE)

(73) Assignee: Infineon Technologies AG, Munich (DE)

( * ) Notice: Subject to any disclaimer, the term of this patent is extended or adjusted under 35 U.S.C. 154(b) by 188 days.

(21) Appl. No.: 10/769,285

(22) Filed: Jan. 30, 2004

(65) Prior Publication Data

US 2004/0240798 A1    Dec. 2, 2004

(30) Foreign Application Priority Data

Jan. 31, 2003   (DE)   ................ 103 05 171

(51) Int. Cl.
*G02B 6/36* (2006.01)
(52) U.S. Cl. .......................... 385/88; 385/93
(58) Field of Classification Search ............. 385/88–94
See application file for complete search history.

(56) References Cited

U.S. PATENT DOCUMENTS 6,433,942 B1 *   8/2002   Memezawa et al. ........ 359/833

FOREIGN PATENT DOCUMENTS

| DE | 195 10 559 C1 | 7/1996 |
| DE | 198 38 571 A1 | 3/1999 |
| DE | 198 23 213 A1 | 12/1999 |

OTHER PUBLICATIONS

Hideaki et al: Optical Transceiver For OP i.LINK S200/S400, Proceedings 11th Int'l POF Conferenece 2002, Tokyo 18th to 20th Sep. 2002, pp. 25-27.

* cited by examiner

*Primary Examiner*—Kevin S Wood
(74) *Attorney, Agent, or Firm*—Eschweiler & Associates, LLC

(57) ABSTRACT

A bidirectional optical transmitting and receiving module for connection to an optical waveguide, having an optical receiving device and an optical transmitting device, with the receiving device being arranged in one region of the optical axis of the optical waveguide, in front of its end surface. In order to make it possible with a transmitting and receiving module such as this for this module to be produced very easily and at the same time in order to very largely avoid electrical crosstalk between the transmitting device and the receiving device, the transmitting device is arranged away from the region of the optical axis of the optical waveguide, and at least one deflection device is arranged in the beam path between the optical waveguide and the receiving device and injects the light which is emitted from the transmitting device into the optical waveguide.

20 Claims, 4 Drawing Sheets

BIDIRECTIONAL OPTICAL TRANSMITTING AND RECEIVING MODULE

FIELD OF THE INVENTION

The invention relates to opto-electronic devices, and in particular to a bidirectional optical transmitting and receiving module.

BACKGROUND OF THE INVENTION

A first known transmitting and receiving module is disclosed, for example, in German Laid-Open Specification DE 198 23 213. In this already known transmitting and receiving module, a laser (optical transmitting device) and the optically active zone of a photodiode (optical receiving device) are arranged immediately in front of the end surface of an optical waveguide. The photodiode and hence the active zone of the photodiode are integrated in a substrate and have a structure which is in the form of a frame and frames a central region of the substrate. The laser is mounted on the substrate in this central region, as a separate component. From the physical point of view—along the optical axis of the optical waveguide—the laser is thus located between the plane that is covered by the photodiode and the end surface of the optical waveguide. The laser and the photodiode are thus both located in the region of the optical axis of the optical waveguide.

Furthermore, a second known transmitting and receiving module is disclosed in "Optical Transceiver for OP i.LINK S200/S400", Hideaki Fukita, Yorishige Ishii, Toshihisa Matsuo, Yoshifumi Iwai, Tetsuo Iwaki, Kazuhito Nagura, Takatoshi Mizoguchi and Yukio Kurata; Proceedings of the 11th International POF Conference 2002, Tokyo, September 18–20, in which a deflection mirror is arranged between the optical receiving device and the end face of the optical waveguide. The transmission light from the optical transmitting device is injected without any physical deflection into an edge area of the end surface of the optical waveguide. The transmitting device and the receiving device in this already known transmitting and receiving module do not physically lie on a plane, so that the module has to have a relatively complicated physical design.

SUMMARY OF THE INVENTION

The present invention is directed to a bidirectional optical transmitting and receiving module which can be produced easily, and in which electrical crosstalk between the transmitting device and the receiving device is at the same time very largely avoided.

On this basis, the present invention provides that the transmitting device is arranged away from the region of the optical axis of the optical waveguide near to the receiving device, and at least one deflection device is arranged in the beam path between the optical waveguide and the receiving device and injects the light which is emitted from the transmitting device into the optical waveguide.

A first major advantage of the bidirectional transmitting and receiving module according to the invention is that the arrangement of the transmitting device away from the region of the optical axis of the optical waveguide—in particular in contrast to the first-mentioned already known transmitting and receiving module (discussed above)—allows physical separation between the receiving device and the transmitting device. The distance between the two devices may in this case be chosen to be sufficiently large to very largely avoid electrical crosstalk between the receiving device and the transmitting device.

A second major advantage of the bidirectional transmitting and receiving module according to the invention is that it can be produced at very low cost. The transmitting device and the receiving device can thus be arranged on a plane such that—in particular in contrast to the second-mentioned already known transmitting and receiving module (discussed above)—the two devices can be arranged, for example, on a printed circuit board, in particular a lead frame.

A third major advantage of the transmitting and receiving module according to the invention is that—in particular in contrast to the second-mentioned already known transmitting and receiving module—this results in very high coupling efficiency between the receiving device and the optical waveguide, specifically because the receiving device is arranged immediately in front of the end surface of the optical waveguide. Owing to the arrangement of the receiving device immediately in front of the end surface, it is furthermore possible to choose the distance between the optical waveguide and the receiving device to be very small as well, so that high coupling efficiency is achieved very largely independently of the numerical aperture of the optical waveguide.

A fourth major advantage of the optical transmitting and receiving module according to the invention is that, owing to the beam guidance of the light from the transmitting device, that is to say specifically owing to the deflection device between the transmitting device and the end surface of the optical waveguide, any light from the transmitting device which is reflected by the end surface of the optical waveguide effectively cannot fall or can fall only insignificantly, on the receiving device; optical crosstalk between the transmitting device and the receiving device is thus largely avoided.

A fifth major advantage of the optical transmitting and receiving module according to the invention is that the module is highly independent of any radial offset between the optical waveguide and the "nominal position", because—in particular in contrast to the second-mentioned already known transmitting and receiving module—the light from the transmitting device can be injected directly into the center of the end surface of the optical waveguide (i.e., relatively independently of tolerances), that is to say not into an edge region of the end surface (i.e., relatively dependent on tolerance).

With respect to simple and thus low-cost mounting of the transmitting and receiving module, it is regarded as being advantageous for the receiving device and the transmitting device to be arranged alongside one another on a printed circuit board, in particular a lead frame. That is because, if these devices are mounted on a printed circuit board, then, for example, conventional automatic component placement machines, such as those which are normally used for the production of electrical printed circuit boards, can be used. The transmitting device may in this case be mounted directly or indirectly on the printed circuit board. If it is mounted directly, the transmitting device is mounted directly on the printed circuit board; if it is mounted indirectly, the transmitting device is first of all mounted on a submount, and is then fitted to the printed circuit board, together with this submount.

In order to avoid the possibility of the transmitting and receiving module becoming dirty or being damaged by moisture, it is regarded as being advantageous for at least the optically active zone of the receiving device and/or the optical transmitting device to be provided or sealed with a translucent material, in particular an encapsulation material.

As already explained above according to the invention a deflection device is provided between the transmitting device and the optical waveguide. With respect to the deflection device, it is regarded as being advantageous for the outer face of the translucent material which faces the optical waveguide to have an optical disturbance point which acts as a deflection element for the deflection device. An optical disturbance point in the translucent material or in the translucent encapsulation material can be produced easily and at a low cost, for example by means of a "stamp", during application of the material, so that in this way it possible to form at least one deflection element for the deflection device particularly easily and at low cost.

In order to ensure that the light which is produced by the transmitting device is coupled into the optical waveguide with an efficiency which is particularly independent of tolerance, it is regarded as being advantageous for the disturbance point to be located in the central region of the optical axis which is formed by the longitudinal axis of the optical waveguide. This is because, when the light is injected in the central region the coupling efficiency is less dependent on any radial offset of the optical waveguide than is the case when light is injected in the edge area of the optical waveguide.

The optical disturbance point may preferably be formed by a groove; a groove such as this may be formed, for example, by a stamp, which is used during the application of the translucent material or of the encapsulation material.

In order to inject the light that is produced by the transmitting device into the optical waveguide, the groove should preferably have a side surface which refracts the light generated by the transmitting device in the direction of the optical axis of the optical waveguide. The deflection device may preferably and additionally have a further deflection element which interacts with the first deflection element and, together with it, forms the "deflection device". The further deflection element may advantageously be formed by a mirror.

The mounting of the further deflection element is in this case particularly simple and is thus advantageously possible, if the further deflection element is arranged on the printed circuit board, physically between the transmitting device and the receiving device.

An edge-emitting laser may advantageously be used, for example, as the transmitting device in the transmitting and receiving module. A particularly compact modular configuration can be achieved using an edge-emitting laser by the light outlet opening of the transmitting device (laser) being arranged vertically (i.e., perpendicular to the horizontally-aligned optical axis), at least essentially vertically, with respect to the end surface of the optical waveguide. The deflection device must then produce a deflection angle of 90 degrees.

A deflection angle of 90 degrees can be achieved if the further deflection element, that is to say for example a mirror, produces a deflection angle relative to the optical axis of the optical waveguide which forms a right angle together—that is to say as the sum of the angles—with the deflection angle which is formed by the first deflection element. A deflection angle of 90 degrees means that any light from the transmitting device which is reflected on the end face of the optical waveguide is likewise thrown back at right angles and therefore cannot strike the optical receiving device.

In general terms, it is regarded as being advantageous for the outer face of the translucent material (for example the encapsulation material) to form a lens which focuses the light that is admitted from the optical waveguide in the direction of the receiving device onto the active surface of the receiving device. A focusing lens such as this allows particularly high coupling efficiency to be achieved between the receiving device and the optical waveguide.

According to another advantageous refinement of the transmitting and receiving module according to the invention, it is regarded as advantageous for the entire deflection device to be arranged exclusively directly in the central region of the optical axis of the optical waveguide. An arrangement such as this results in a particularly compact modular configuration which is independent of tolerances. Independence of tolerances is in this case based in particular on the fact that the light which is produced by the transmitting device is injected directly into the central region of the optical waveguide.

The deflection device may preferably be formed by a single mirror which is arranged "on" the receiving device. The mirror should preferably be positioned at an angle of approximately 45° with respect to the optical axis of the optical waveguide. The active zone of the receiving device may have a structure in the form of a frame and, "as a frame" may frame the mirror which is arranged in the central region of the optical axis.

In general terms, it is regarded as advantageous for a lens which focuses the light from the transmitting device onto the deflection device to be arranged between the transmitting device and the deflection device. A lens such as this allows the coupling efficiency between the transmitting device and the optical waveguide to be increased further. The lens may, for example, be formed by a spherical lens; instead of this, the lens may be formed by an appropriate shape of a housing for the transmitting device.

Since the encapsulation materials for encapsulation of the transmitting and receiving module normally have a refractive index of approximately n=1.5, the use of GaP material as the lens material is regarded as advantageous; this GaP has a refractive index of approximately n=3, which is less than the refractive index of the semiconductor material of the transmitting device (approximately n=3.5) and is greater than the refractive index of the encapsulation material (for example casting resin).

DETAILED DESCRIPTION

Figure 1:
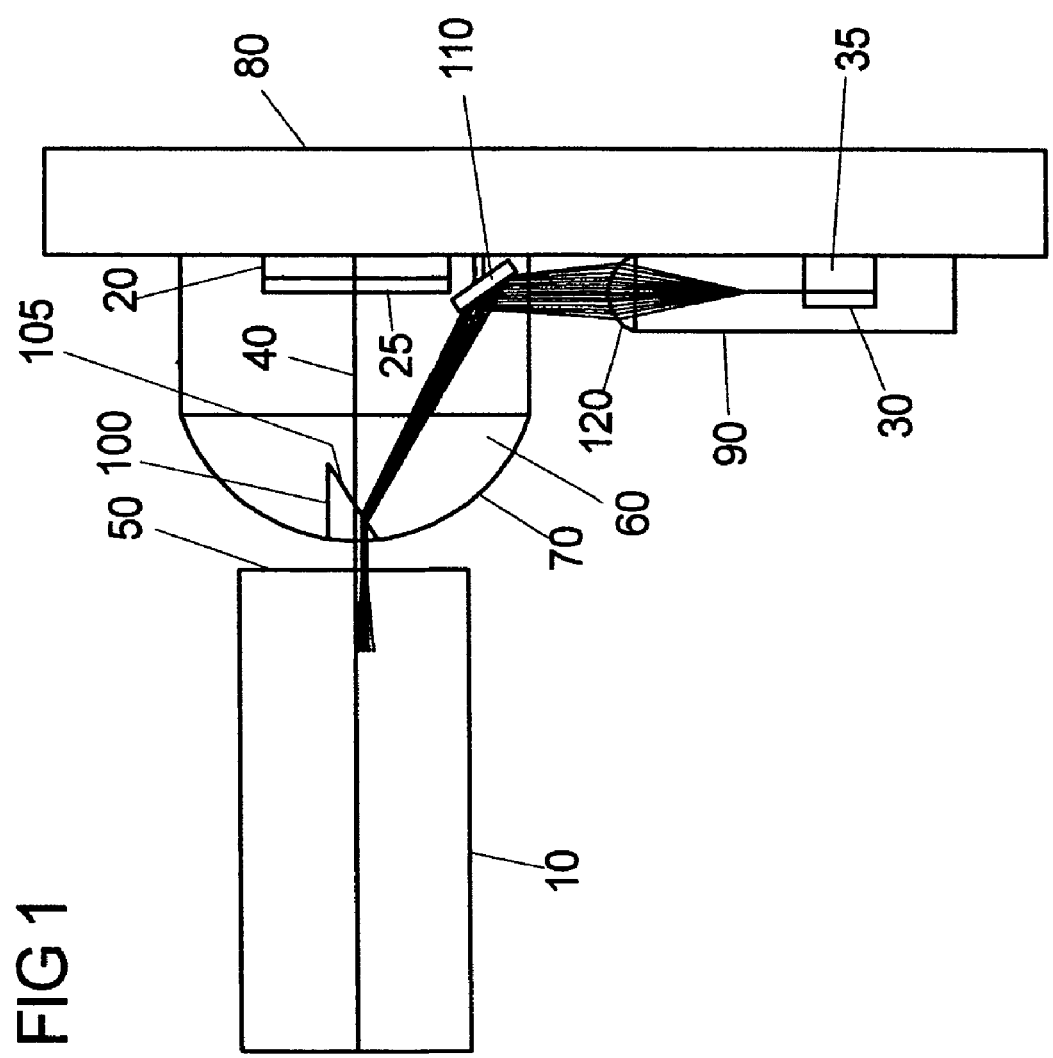
FIG. 1 shows a first exemplary embodiment of a bidirectional transmitting and receiving module according to the invention, in which a deflection device which is formed from two deflection elements is provided, and the transmitting and receiving devices are accommodated in separate housings.

FIG. 1 shows an optical waveguide 10 which is optically connected to a photodiode 20, which is provided with polarization filter 25 as the receiving device, and to a laser 30 as the transmitting device. When seen along the (first) optical axis 40 defined by the optical waveguide 10, the photodiode 20 is in this case arranged in front of the surface 50 of the optical waveguide.

A translucent isolation material 60, for example an encapsulation compound, is provided between the photodiode 20 and the surface 50 of the optical waveguide 10, and protects the photodiode 20 against dirt or moisture. The shape of the outer surface of the isolation material 60 forms a lens 70—for example, a spherical lens or an aspherical lens, in this case referred to by way of example in the following text as a spherical lens—which focuses the light from the optical waveguide 10 so as to achieve particularly high coupling efficiency between the optical waveguide 10 and the photodiode 20.

The photodiode 20 and the laser 30 are arranged on a printed circuit board (base) 80—possibly indirectly on a submount 35—so that the laser light which is produced by the (for example edge-emitting) laser 30 at the light outlet opening of a laser housing 90 of the laser 30 emerges (i.e., directed along a second optical axis) essentially at right angles to the optical axis 40 of the optical waveguide 10. In order to ensure that the light which is produced by the laser 30 is injected into the optical waveguide 10, a deflection device is provided which comprises a (first) deflection element 100 and a further (second) deflection element 110.

The first deflection element 100 is in this case formed by a recess—that is to say a disturbance point—in the spherical lens 70. The recess is in the form of a groove and is located in the central region of the optical axis 40 of the optical waveguide 10. The groove 100, or a side surface 105 of the groove 100, is in this case at an angle to the optical axis 40 such that the light which is generated by the laser 30 is refracted in the direction of the optical axis 40 of the optical waveguide 10.

The second deflection element 110 is formed by a mirror, which is mounted on the printed circuit board 80 between the laser 30 and the photodiode 20. The mirror 110 is in this case aligned such that the "light deflection angle" of the groove 100 and the "light deflection angle" of the mirror 110 together form an "overall deflection angle" 90 degrees.

The arrangement of the two deflection elements 100 and 110 therefore ensures that the light which is produced by the laser 30 is deflected through an angle of approximately 90° and can be injected into the optical waveguide 10 at the end surface 50.

The size of the first deflection element 100 is in this case chosen such that the deflection element produces only a minor disturbance in the beam path between the optical waveguide 10 and the photodiode 20. Although the first deflection element 100 is arranged in the central region of the optical axis 40, the physical size of the first deflection element 100 is, however, so small that, overall, it represents only a minor disturbance, so that the coupling efficiency between the photodiode 20 and the optical waveguide 10 is reduced only slightly and is thus still sufficiently high overall.

As can be seen from FIG. 1, the deflection effect of the first deflection element 100 is based on the sudden change in the refractive index between, on the one hand, the material of the spherical lens 70 and, on the other hand, the air between the spherical lens 70 and the optical waveguide 10. The side surface 105 of the groove 100 therefore may not be aligned at an angle of 45° to the optical axis 40 of the optical waveguide 10—as is accidentally the impression given by FIG. 1—but such that the light which is reflected by the second deflection element 110 can be injected into the optical waveguide 10 with the maximum possible coupling efficiency. The angle of the groove 100 therefore depends on the sudden change in the refractive indices of the materials, and must be chosen appropriately.

Furthermore, FIG. 1 shows a further lens 120 which is arranged immediately adjacent to the housing outer surface of the laser housing 90 of the laser 30. The function of this further lens 120 is to focus the light which emerges from the laser 30 before it strikes the second deflection element 110, in order to achieve particularly high coupling efficiency between the laser 30 and the optical waveguide 10.

Figure 2:
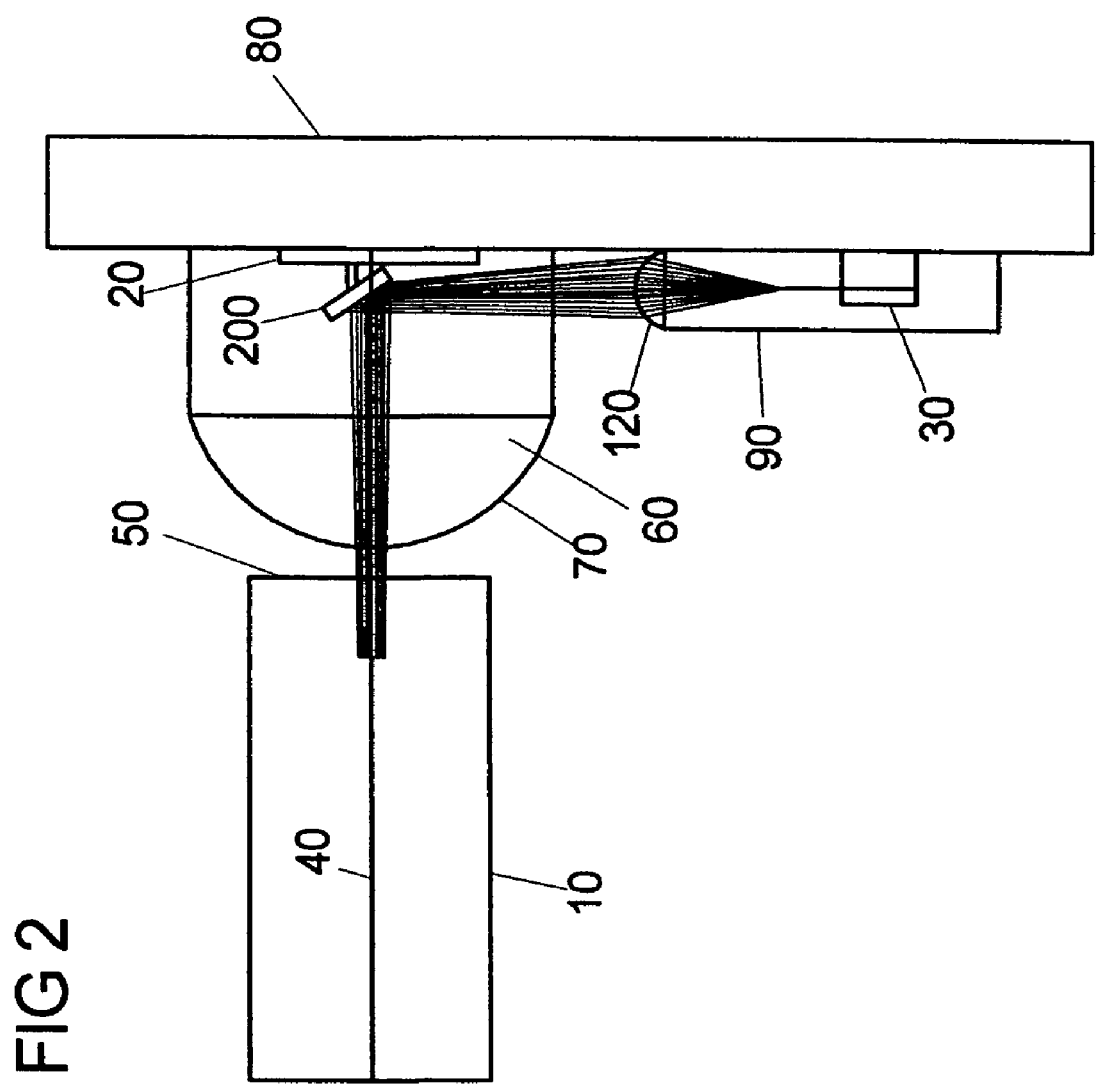
FIG. 2 shows a second exemplary embodiment of a transmitting and receiving module according to the invention in which a mirror which is arranged in the region of the optical axis of the optical waveguide is provided as the deflection device.

FIG. 2 shows a second exemplary embodiment of a bidirectional optical transmitting and receiving module according to the invention. In this exemplary embodiment as well, the laser 30 and the photodiode 20 are arranged on a printed circuit board 80. A mirror 200 is arranged in the region of the optical axis 40, immediately adjacent to the photodiode 20.

The mirror is positioned at an angle of 45° to the optical axis 40 of the optical waveguide 10, so that the laser light which is produced by the laser 30 is injected directly into the optical waveguide 10 from the mirror 200. The size of the mirror 200 is in this case chosen to be as small as possible, in order to avoid the coupling efficiency between the photodiode 20 and the optical waveguide 10 being excessively reduced.

In summary, the mirror surface of the mirror 200 should thus be chosen to be sufficiently small that, on the one hand, sufficient coupling is achieved for the light which is produced by the laser 30 into the optical waveguide 10 and, on the other hand, such that any disturbance to the light transmission between the optical waveguide 10 and the photodiode 20 is reduced to the minimum extent.

In the exemplary embodiment shown in FIG. 2, the mirror 200 deflects the beam of the laser light through 90°, in order to ensure that it is coupled into the optical waveguide 10. In the exemplary embodiment shown in FIG. 2, there is therefore no need for any first deflection element 100, such as that which is formed by a groove in the exemplary embodiment shown in FIG. 1.

Overall, the mirror 200 means that the laser 30 and the photodiode 20 can be arranged physically separately from one another, thus effectively avoiding, or at least greatly reducing any electrical crosstalk between the photodiode 20 and the laser 30.

Further variants and exemplary embodiments of transmitting and receiving modules according to the invention are illustrated in FIGS. 3 to 6.

In the exemplary embodiments shown in FIGS. 3 to 6, the laser 30 does not have its own housing 90; instead of this, the laser 30 is encapsulated together with the photodiode 20, and is thus embedded in the isolation material 60. In the exemplary embodiment shown in FIG. 3, the isolation material 60 forms the spherical lens 70, which has already been explained in conjunction with FIGS. 1 and 2; the exemplary embodiments shown in FIGS. 4 and 5 have no such spherical lens 70.

Figure 3:
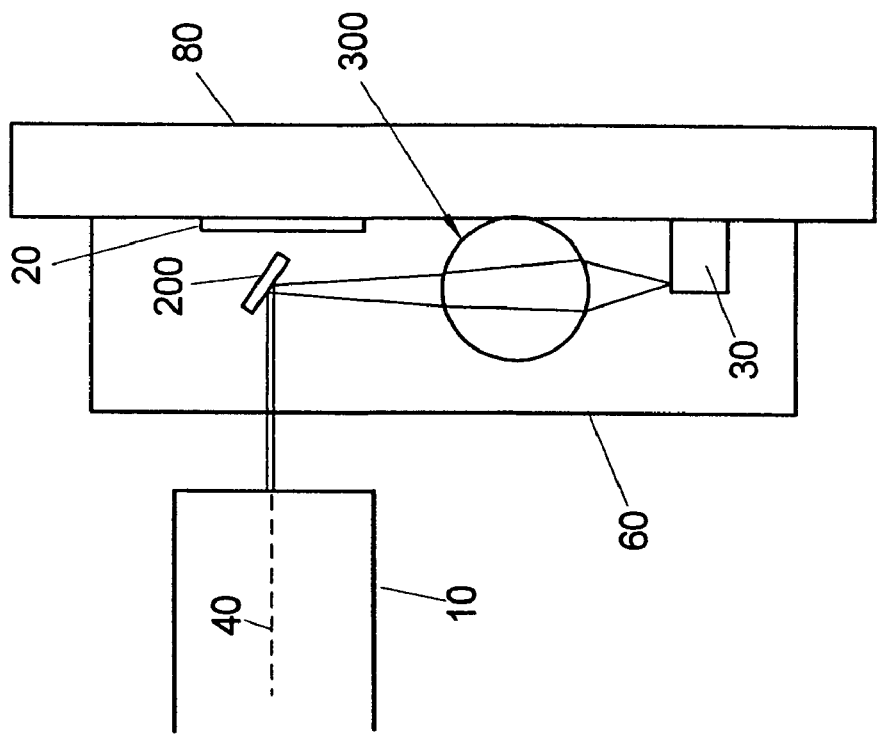
FIG. 3 shows a third exemplary embodiment of a bidirectional transmitting and receiving module according to the invention, in which the transmitting and receiving devices are encapsulated with one another, and the shape of the encapsulation compound forms a lens.
Figure 4:
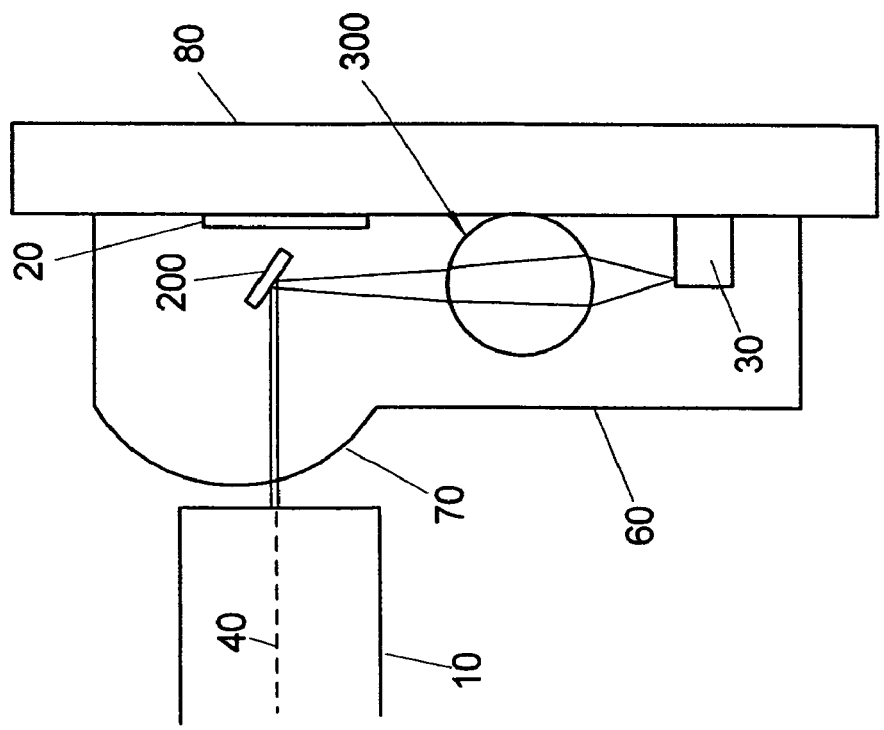
FIG. 4 shows a fourth exemplary embodiment of a bidirectional transmitting and receiving module according to the invention, in which the transmitting and receiving devices are encapsulated with one another, but with the shape of the encapsulation compound not forming a lens.
Figure 6:
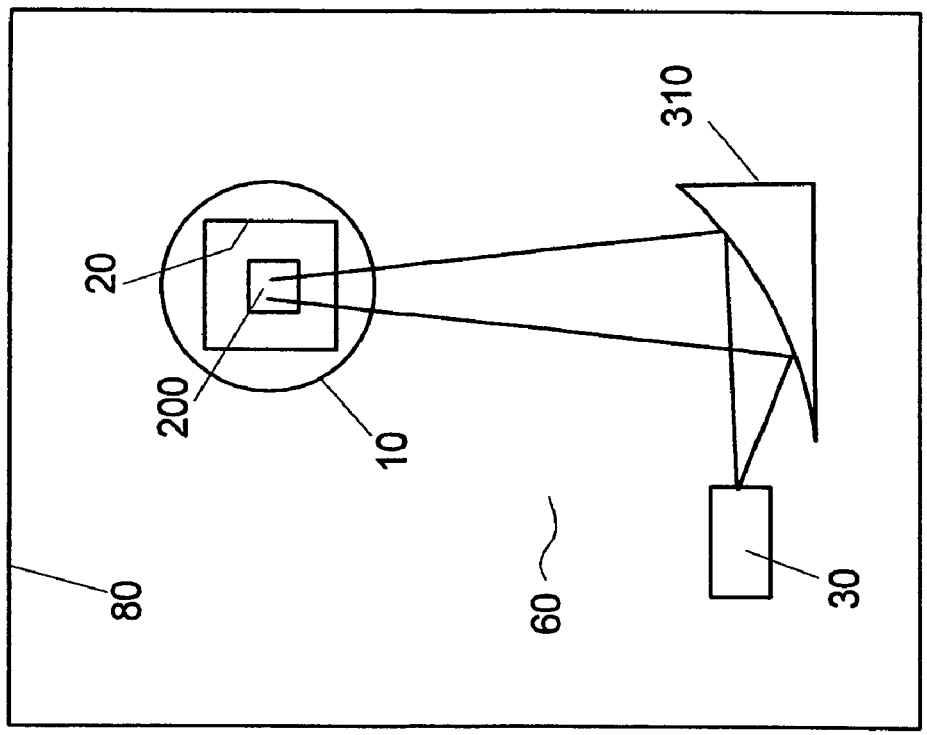
FIG. 6 shows a sixth exemplary embodiment of a bidirectional transmitting and receiving module according to the invention—in the form of a plan view along the optical axis of the optical waveguide—in which a beam-forming element is located between the transmitting device and a mirror.
Figure 5:
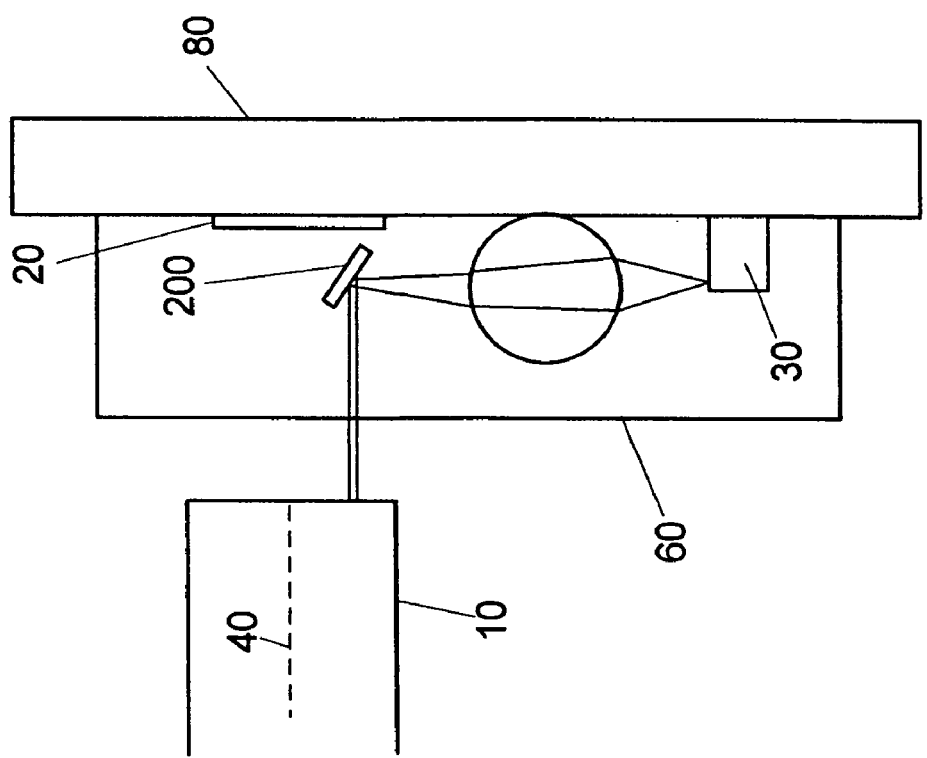
FIG. 5 shows a fifth exemplary embodiment of a bidirectional transmitting and receiving module according to the invention, in which the light from the transmitting device is injected into the optical waveguide away from the central region of the optical waveguide.

In the exemplary embodiments shown in FIGS. 3, 4 and 5, a spherical lens 300 is arranged between the laser 30 and the mirror 200 for beam focusing. The spherical lens 300 is mounted on the printed circuit board 80 and is encapsulated together with the laser 30 and the photodiode 20 by means of the isolation material 60. In the exemplary embodiment shown in FIG. 6, a beam-forming element 310 is provided instead of a spherical lens, and is formed by the shaping of the isolation material 60 (encapsulation compound) or by a separate mirror element. The beam-forming element 310 is preferably mirrored, for example by means of a metallization layer.

In general terms, as can be seen from FIG. 5, the light from the laser 30 can also be injected eccentrically into the optical waveguide 10. In the case of multimode optical waveguides, for example, an adequate coupling efficiency can still be achieved even when the light is injected eccentrically.

In the two exemplary embodiments, shown in FIGS. 3 to 5, the spherical lens 30 may, for example, be formed by a gallium phosphide GaP) lens; gallium phosphide has a refractive index of approximately n=3, which is higher than the refractive index of n=1.54 of the isolation material 60 (for example casting resin), and is less than the refractive index of the laser 30 (n=3.5).

In order to avoid the light which is generated by the laser 30 from being reflected on the end surface 50 of the optical waveguide 10 and partially being coupled back into the laser 10 again, polarization films with quarter-lambda delay elements may be used; quarter-lambda delay elements such as these rotate the polarization direction of the light which is generated by the laser 30 so that the light which is reflected back from the optical waveguide has a polarization which differs from that of the light which was originally produced by the laser 30. The light which is reflected back can then be filtered out by means of an appropriate polarization filter, so that this avoids feedback into the laser 30.

The invention claimed is:

1. A bidirectional optical transmitting and receiving module for connecting to an optical waveguide defining an optical axis, the transmitting and receiving module comprising at least one optical receiving device and at least one optical transmitting device, wherein the receiving device is aligned with the optical axis, wherein the transmitting device is arranged away from the optical axis, and wherein the transmitting and receiving module further comprises at least one deflection device arranged in the optical axis between the optical waveguide and the receiving device and aligned such that the deflection device deflects light emitted from the transmitting device into the optical waveguide, wherein the receiving device and the transmitting device are arranged alongside one another on a printed circuit board, and further comprising a translucent material formed over in an optically active zone of the receiving device, wherein an outer face of the translucent material facing the optical waveguide has an optical disturbance point, and wherein the optical disturbance point forms a deflection element of the deflection device, and wherein the optical disturbance point is formed by a groove.

2. The transmitting and receiving module as claimed in claim 1, wherein the deflection device is located directly in the center of the optical axis of the optical waveguide, and wherein a physical size of the deflection device is smaller than a beam size of light emerging from the waveguide in a direction of the receiving device.

3. The transmitting and receiving module as claimed in claim 1 wherein the optical disturbance point is located in a central region of the optical axis defined by the optical waveguide.

4. The transmitting and receiving module as claimed in claim 1 wherein the groove has a side surface which is aligned to refract the light generated by the laser in the direction of the optical axis defined by the optical waveguide.

5. The transmitting and receiving module as claimed in claim 4 wherein the deflection device comprises a first deflection element and a second deflection element, wherein the second deflection element deflects the light emitted by the laser to the first deflection element, and wherein the first deflection element deflects the light received from the second deflection element into the optical waveguide.

6. The transmitting and receiving module as claimed in claim 5 wherein the second deflection element comprises a mirror.

7. The transmitting and receiving module as claimed in claim 5 wherein the second deflection element is mounted on the printed circuit board and located between the transmitting device and the receiving device.

8. The transmitting and receiving module as claimed in claim 1 wherein a light outlet opening of the transmitting device is arranged substantially perpendicular with respect to the optical axis.

9. The transmitting and receiving module as claimed in claim 8 wherein the at least one deflection device comprises a first deflection element that defines a first deflection angle, and a second deflection element that comprises a mirror that is aligned to provide a second deflection angle, and wherein the first and second deflection angles form a right angle.

10. The transmitting and receiving module as claimed in claim 1 wherein an outer surface of the translucent material is shaped to form a lens which focuses light that is received from the optical waveguide onto the active surface of the receiving device.

11. The transmitting and receiving module as claimed in claim 1 wherein the deflection device is mounted on the receiving device.

12. The transmitting and receiving module as claimed in claim 11 wherein the deflection device is arranged in a central region of the optical axis defined by the optical waveguide.

13. The transmitting and receiving module as claimed in claim 12 wherein the deflection device comprises a mirror.

14. The transmitting and receiving module as claimed in claim 13 wherein the mirror is arranged at an angle of approximately 45° with respect to the optical axis defined by the optical waveguide.

15. The transmitting and receiving module as claimed in claim 1 further comprising a lens located between the transmitting device and the deflection device, and arranged to focus the light from the transmitting device onto the deflection device.

16. The transmitting and receiving module as claimed in claim 15 wherein the lens is one of a spherical lens and an aspherical lens attached to a housing of the transmitting device.

17. The transmitting and receiving module as claimed in claim 16 wherein the lens is composed of GaP material.

18. The bidirectional optical transmitting and receiving module of claim 1, wherein the optical coupling between the waveguide and the receiving element is based solely on light from the outside of the center of the optical axis.

19. The bidirectional optical transmitting and receiving module of claim 1, wherein the deflection device is not transmissive to received light from the waveguide.

20. A bidirectional optical transmitting and receiving module for connecting to an optical waveguide defining an optical axis, the transmitting and receiving module comprising at least one optical receiving device and at least one optical transmitting device, wherein the receiving device is aligned with the optical axis, wherein the transmitting device is arranged away from the optical axis, and wherein the transmitting and receiving module further comprises at least one deflection device arranged in the optical axis between the optical waveguide and the receiving device and aligned such that the deflection device deflects light emitted from the transmitting device into the optical waveguide and further comprising a polarization filter arranged on the receiving device such that the light generated by the transmitting device that strikes the polarization filter is attenuated by the polarization filter.

* * * * *